US012451589B2

(12) United States Patent
Chen et al.

(10) Patent No.: US 12,451,589 B2
(45) Date of Patent: Oct. 21, 2025

(54) ANTENNA PACKAGE AND METHOD FOR MANUFACTURING AN ANTENNA PACKAGE

(71) Applicant: TRON FUTURE TECH INC., Hsinchu (TW)

(72) Inventors: Kuan-Neng Chen, Hsinchu (TW); Han-Wen Hu, Hsinchu (TW); Yu-Jiu Wang, Hsinchu (TW); Li Han Chang, Hsinchu (TW)

(73) Assignee: TRON FUTURE TECH INC., Hsinchu (TW)

( * ) Notice: Subject to any disclaimer, the term of this patent is extended or adjusted under 35 U.S.C. 154(b) by 213 days.

(21) Appl. No.: 18/317,304

(22) Filed: May 15, 2023

(65) Prior Publication Data

US 2024/0283130 A1    Aug. 22, 2024

Related U.S. Application Data

(60) Provisional application No. 63/486,103, filed on Feb. 21, 2023.

(51) Int. Cl.
*H01Q 1/22* (2006.01)
*H01Q 1/42* (2006.01)
*H01Q 9/04* (2006.01)

(52) U.S. Cl.
CPC .......... *H01Q 1/2283* (2013.01); *H01Q 1/422* (2013.01); *H01Q 9/0407* (2013.01)

(58) Field of Classification Search
CPC .... H01Q 1/2283; H01Q 1/422; H01Q 9/0407; H01Q 1/38; H01Q 21/065; H01Q 1/2208; H01Q 1/12; H01Q 21/00; H01Q 21/0087
See application file for complete search history.

(56) References Cited

U.S. PATENT DOCUMENTS 8,177,137 B2 * 5/2012 Arai .......................... H01Q 7/00 343/893
9,196,951 B2 * 11/2015 Baks .................... H01Q 1/2283
(Continued)

FOREIGN PATENT DOCUMENTS

| | | |
|---|---|---|
| CN | 110323540 A | 1/2022 |
| JP | 66580 | 2/1994 |

(Continued)

OTHER PUBLICATIONS

Office Action issued by TIPO dated Sep. 23, 2024 for TW113101761.
English Summary of the Office Action issued by TIPO dated Sep. 23, 2024 for TW113101761.
English translation of the Search Report appended to the Office Action issued by TIPO dated Sep. 23, 2024 for TW113101761.
English abstract of CN110323540.
(Continued)

*Primary Examiner* — Seung H Lee
(74) *Attorney, Agent, or Firm* — WPAT, P.C.; Anthony King

(57) ABSTRACT

An antenna package is provided. The antenna package includes a glass substrate, a plurality of antennas, a multi-layer circuit structure, and a plurality of radio frequency chips. The glass substrate has a first surface and a second surface. The plurality of antennas are arranged on the first surface of the glass substrate. The multi-layer circuit structure has a first surface and a second surface. The plurality of radio frequency chips are arranged on the first surface of the multi-layer circuit structure. The second surface of the glass substrate is adhered to the second surface of the multi-layer circuit structure.

16 Claims, 13 Drawing Sheets

(56) References Cited

U.S. PATENT DOCUMENTS

| | | | | |
|---|---|---|---|---|
| 10,490,880 | B2 * | 11/2019 | Lasiter | H01Q 1/46 |
| 10,886,593 | B2 * | 1/2021 | Chiang | H03H 7/38 |
| 11,056,765 | B2 * | 7/2021 | Kamgaing | H01L 23/3128 |
| 11,189,905 | B2 * | 11/2021 | Gu | H01L 23/5389 |
| 2018/0191052 | A1 | 7/2018 | Ndip et al. | |
| 2019/0181105 | A1 | 6/2019 | Chen et al. | |
| 2020/0098709 | A1 | 3/2020 | Lin et al. | |
| 2020/0313279 | A1 * | 10/2020 | Kim | H01Q 21/08 |
| 2022/0415829 | A1 * | 12/2022 | Blecic | H01L 23/645 |

FOREIGN PATENT DOCUMENTS

| | | | | |
|---|---|---|---|---|
| JP | 2005086603 | A | 3/2005 | |
| KR | 10-2020-0119730 | A | 10/2020 | |
| TW | 200423305 | A | 9/2004 | |
| TW | M376906 | U | 3/2010 | |
| TW | M620765 | U | 12/2021 | |
| WO | WO-2021078038 | A1 * | 4/2021 | H01Q 1/22 |

OTHER PUBLICATIONS

Rejection Decision issued by TIPO dated Mar. 12, 2025 for TW113101761.
English Summary of the Rejection Decision issued by TIPO dated Mar. 12, 2025 for TW113101761.
English translation of the abstract of TWM376906U.
English translation of the abstract of TW200423305A.
English translation of the abstract of TWM620765U.
Office Action issued by KIPO dated Mar. 19, 2025 for KR 10-2024-0015611.
English Summary of the Office Action issued by KIPO dated Mar. 19, 2025 for KR 10-2024-0015611.
English translation of the abstract of KR_10-2020-0119730.
Notice of Reason for Rejection issued by JPO dated Feb. 12, 2025 for JP 2024-022504.
English Summary of the Notice of Reason for Rejection issued by JPO dated Feb. 12, 2025 for JP 2024-022504.
English translation of the abstract of JP 2005-086603.
English translation of the abstract of JP 6-6580.

* cited by examiner

ANTENNA PACKAGE AND METHOD FOR MANUFACTURING AN ANTENNA PACKAGE

CROSS REFERENCE

This application claims the benefit of prior-filed U.S. provisional application No. 63/486,103, filed on Feb. 21, 2023, which is incorporated by reference in its entirety.

TECHNICAL FIELD

The present disclosure relates to an antenna package, and more particularly, to an antenna package including a large-scale antenna array.

DISCUSSION OF THE BACKGROUND

In modern wireless communication technologies, satellite communications has become competitive for it provides better signal coverage and higher bandwidth as compared to conventional terrestrial communication technologies. To achieve the satellite communications, large-scale phased-array antenna that can achieve beamforming and high power gain is demanded. However, the large-scale phased-array antenna requires a much greater substrate area than the conventional non-array antenna does. Therefore, the manufacturing process can be challenging and expensive. Furthermore, to accommodate the array antennas along with the corresponding radio frequency (RF) chips within a package makes it even more difficult for mass production. Therefore, there is a need to develop a new antenna package to raise the yield rate and lower the manufacturing cost.

SUMMARY

One aspect of the present disclosure provides an antenna package. The antenna package includes a glass substrate, a plurality of antennas, a multi-layer circuit structure, and a plurality of radio frequency chips. The glass substrate has a first surface and a second surface, and the antennas are arranged on the first surface of the glass substrate. The multi-layer circuit structure has a first surface and a second surface, and the plurality of radio frequency (RF) chips are arranged on the first surface of the multi-layer circuit structure. The second surface of the glass substrate is adhered to the second surface of the multi-layer circuit structure.

Another aspect of the present disclosure provides a method for manufacturing an antenna package. The method includes providing a glass substrate having a first surface and a second surface, providing a multi-layer circuit structure having a first surface and a second surface, adhering the second surface of the glass substrate to the second surface of the multi-layer circuit structure, and arranging a plurality of antennas on the first surface of the glass substrate.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures.

DETAILED DESCRIPTION

Figure 1A:
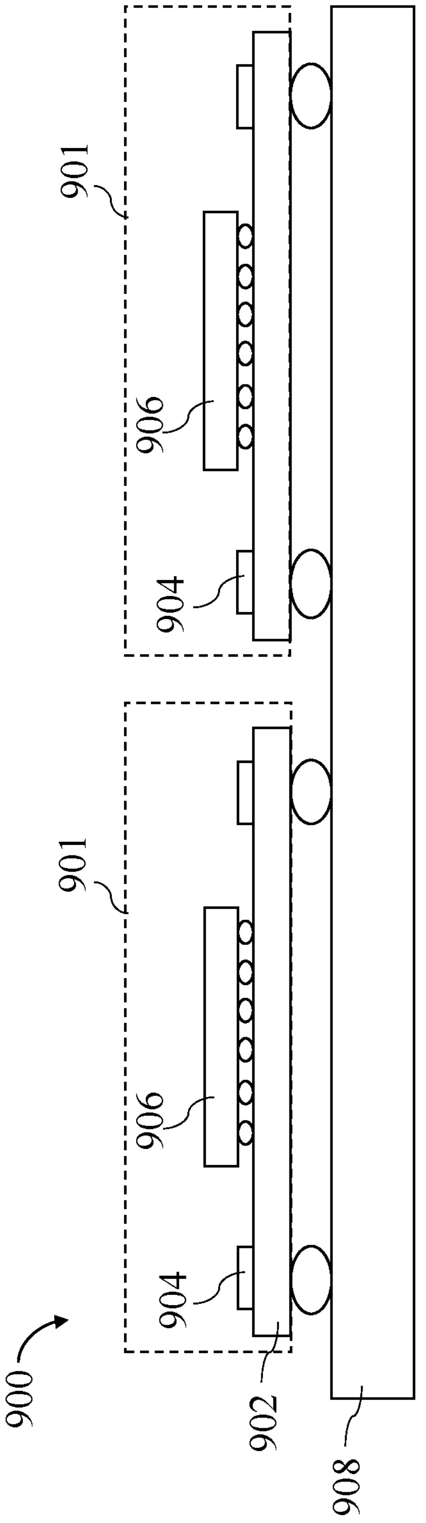
FIG. 1A shows an antenna package according to one comparative embodiment.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper", "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, the terms such as "first", "second" and "third" describe various elements, components, regions, layers and/or sections, these elements, components, regions, layers and/or sections should not be limited by these terms. These terms may be only used to distinguish one element, component, region, layer, or section from another. The terms such as "first", "second", and "third" when used herein do not imply a sequence or order unless clearly indicated by the context.

FIG. 1A shows an antenna package 900 according to one comparative embodiment. The antenna package 900 is packaged under the Antenna-in-Package (AiP) technology. As shown in FIG. 1A, a typical AiP structure 901 can be seen as a module that includes a package substrate 902, a plurality of antennas 904, and one or more RF chip 906. The antennas 904 and the RF chip 906 are arranged on a top side of the package substrate 902. Furthermore, to realize phased-array antennas, a plurality of AiP structures 901 may be further assembled to a printed circuit board (PCB) 908. That is, two levels of substrates (i.e., the substrate 902 and the PCB 908) are required for the antenna package 900 when the AiP structures 901 is adopted. In such case, the manufacturing process for the antenna package 900 including phased-array antennas can be complicated and costly.

Figure 1B:
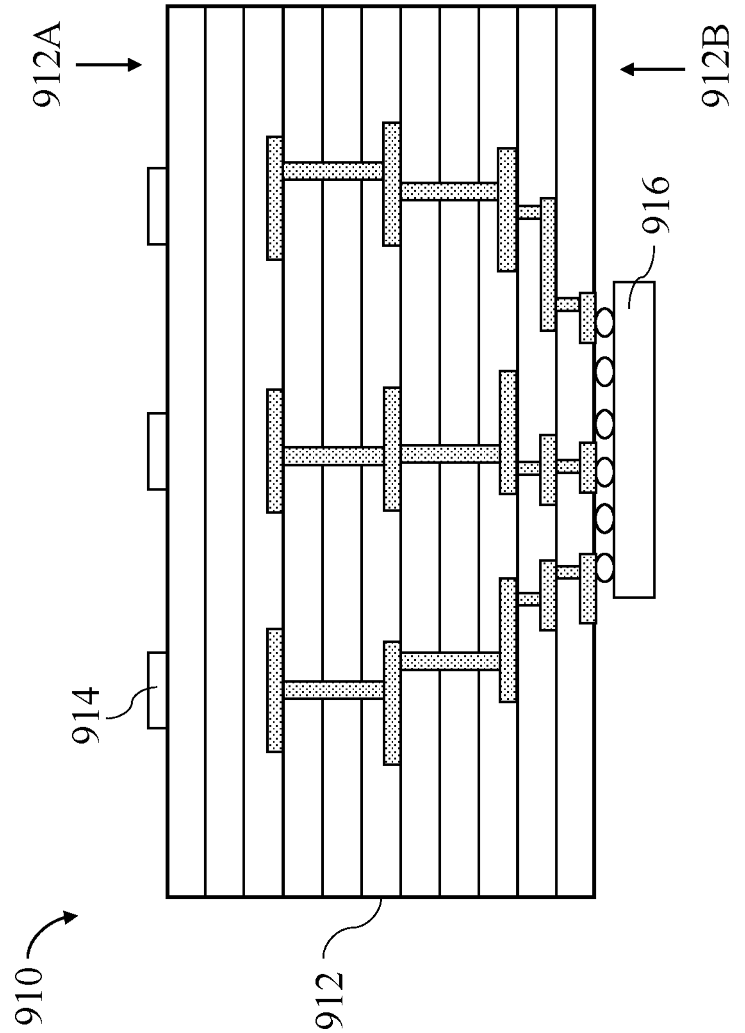
FIG. 1B shows an antenna package according to another comparative embodiment.

FIG. 1B shows an antenna package 910 according to another comparative embodiment. In the antenna package 910, a high density interconnect (HDI) printed circuit board (PCB) 912 is adopted. By using HDI technology, designers can place more components on both sides of the raw PCB. For example, antennas 914 can be formed on a first side 912A of the HDI PCB 912, and the RF chips 916 can be attached to the second side 912B of the HDI PCB 912. Therefore, unlike the antenna package 900, the antenna package 910 only require one level of substrate. However, since the thermal expansion coefficient of the HDI PCB 912 is rather high, profile defects such as warpage can occur easily in processes that need to be performed under high temperature. For example, the curing process for molding the RF chips 916 under 200° C. to 250° C. may cause warpage to the HDI PCB 912, thereby causing reliability issue on flip-chip bonding and molding of the RF chips 916. Furthermore, as the scale of the antenna package 910 increases, the warpage may become even more serious. In such case, to preserve the flat profile of the antenna package 910, the RF chips 916 encapsulation may be performed on an individual basis, which can be very time-consuming and cost-ineffective. Furthermore, to reduce the degree of warpage, the HDI PCB 912 may have to include a greater number of layers (e.g., more than 10 layers) so as to form a symmetric lamination structure with respect to a core layer, which inevitably increases the thickness of the antenna package 910. Especially when low dielectric constant materials are chosen as the lamination dielectric, greater number of layers leads to higher production cost.

Figure 2:
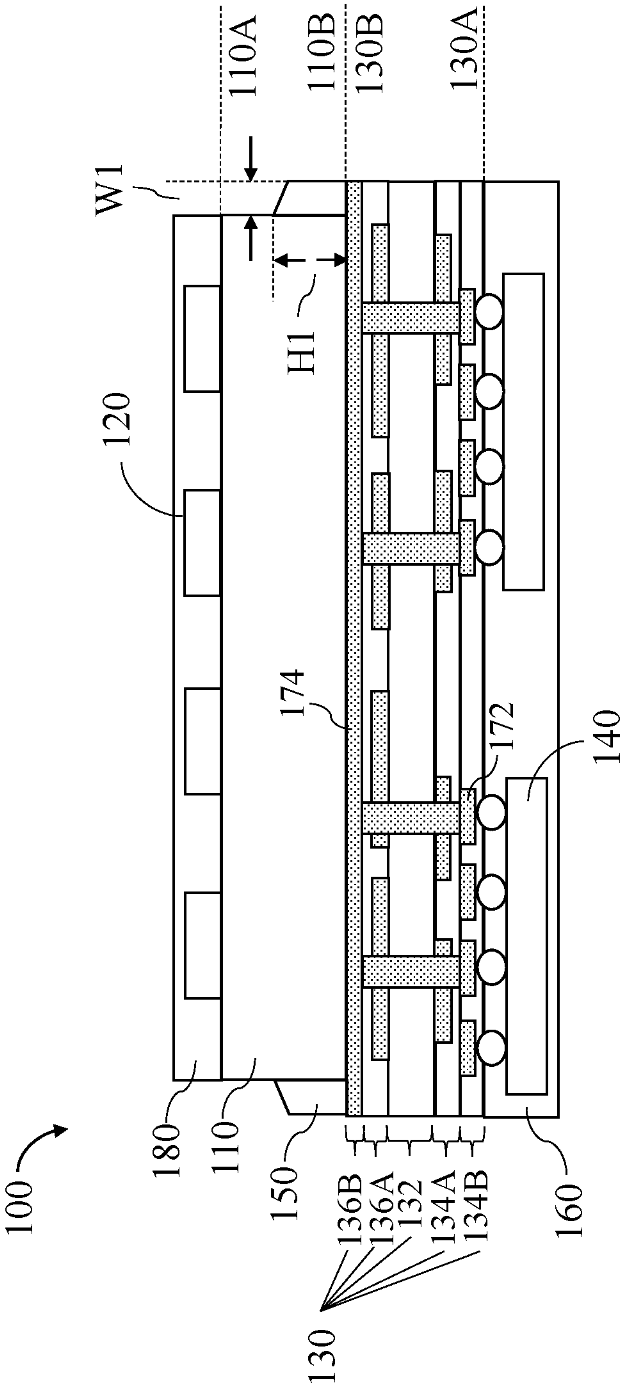
FIG. 2 shows an antenna package according to one embodiment of the present disclosure.

FIG. 2 shows an antenna package 100 according to one embodiment of the present disclosure. The antenna package 100 includes a glass substrate 110, a plurality of antennas 120, a multi-layer circuit structure 130, and a plurality of RF chips 140. As shown in FIG. 2, the glass substrate 110 has a first surface 110A and a second surface 110B, and the antennas 120 are arranged on the first surface 110A of the glass substrate 110. The multi-layer circuit structure 130 has a first surface 130A and a second surface 130B, and the RF chips 140 are arranged on the first surface 130A of the multi-layer circuit structure 130. Furthermore, the second surface 110B of the glass substrate 110 is adhered to the second surface 130B of the multi-layer circuit structure 130 by adhesion material 150 applied on the second surface 130B of the multi-layer circuit structure 130 and surrounding the glass substrate 110.

In the present embodiment, since the glass substrate 110 has low coefficient of thermal expansion (CTE), the glass substrate 110 can provide sufficient rigidity to the multi-layer circuit structure 130 and preventing the antenna package 100 from warpage under high temperature (e.g., 200° C. to 250° C.), which allows more flexibility for the manufacturing processes. For example, due to the structural enhancement and low CTE provided by the glass substrate 110, the molding layer 160 on the RF chips 140 can be formed and cured in one molding operation without concerning the warpage. Therefore, the molding process can be performed much more efficiently, and, as shown in FIG. 2, the molding layer 160 can form a continuous encapsulation among the multiple RF chips 140, or an array of the RF chips 140. In addition, with the implementation of the glass substrate 110 in the antenna package 100, the number of the multi-layer circuit structure 130 can be decreased from more than 10 layers to 4 or 6 layers, not only decreasing the production cost but also provide better resistance to warpage especially at a large scale (e.g., equal to or greater than 200 mm to 200 mm).

In the present embodiment, the multi-layer circuit structure 130 may be a high density interconnection printed circuit board or a conventional printed circuit board. In some embodiments, the multi-layer circuit structure includes a core 132, a number of interconnection layers 134A, 134B or build up layers, and a number of interconnection layers 134A, 134B or build up layers. As shown in FIG. 2, the interconnection layers 134A and 134B are arranged between the core 132 and the first surface 130A of the multi-layer circuit structure 130, and the interconnection layers 136A and 136B are arranged between the core 132 and the second surface 130B of the multi-layer circuit structure 130.

The core 132 and the interconnection layers 134A, 134B, 136A, 136B can provide signal transmission paths between the antennas 120 and the RF chips 140. In some embodiments, the core 132 and the interconnection layers 134A, 134B, 136A, 136B may include conductive traces for providing the signal transmission paths. In addition, to insulate different traces from each other, the interconnection layers 134A, 134B, 136A may further include dielectric materials interlayered with the conductive traces. In some embodiments, the dielectric portion of the multi-layer circuit structure 130 may include pre-preg materials, and the conductive portion of the multi-layer circuit structure 130 may include conductive materials, such as copper, tungsten, aluminum, titanium, tantalum, alloys thereof, or the like. In some embodiments, the core 132 can be a copper clad laminate (CCL). In some embodiments, the core 132 may include plated through holes.

In the present embodiment, the interconnection layers 134B include a plurality of feed lines 172 at the first surface 130A of the multi-layer circuit structure 130 coupled to the RF chips 140. The feed lines 172 can be seen as input/output port of the antennas 120 and can feed the RF signals to/from the antenna 120. For example, the RF signals generated by the RF chips 140 may be fed to antenna 120 through the feed lines 172, and the RF signals that fed into the feed lines 172 can be further transmitted to the antenna 120 through the transmission paths provided by the interconnection layers 134A, 134B, 136A, 136B and the core 132 within the multi-layer circuit structure 130.

In addition, in the present embodiment, the glass substrate 110 can be via free, that is, it is free from having via holes penetrating through the glass substrate 110. Therefore, the first surface 110A and the second surface 110B of the glass substrate 110 can be entirely plain and intact. In such case, the transmission of the RF signals between the antennas 120 and the RF chips 140 is partly rely on wireless coupling through the glass substrate 110.

In order to wirelessly couple the antennas 120 and the RF chips 140 through the glass substrate 110, the electromagnetic coupling technique is applied. That is, in the present embodiment, the communication between the antennas 120 and the RF chips 140 is partly based on the RF signals passing through the glass substrate 110 substantially transparent or with acceptable attenuation to RF band. In some embodiments, interconnection layers 136B may include a ground plane 174 at the second surface 130B of the multi-layer circuit structure 130. That is, the ground plane 174 can be formed on the second surface 130B of the multi-layer circuit structure 130. In addition, the ground plane 174 can be formed with one or more apertures (not shown) that allow the transmission of electromagnetic signals.

As a result, the RF signals fed into the feed lines 172 may be transmitted to the apertures of the ground plane 174 through the conductive paths provided by the interconnection layers 134A, 136A, and can be transmitted wirelessly through the glass substrate 110 from the apertures of the ground plane 174 to the antennas 120. Similarly, RF signals received from air by the antennas 120 can be transmitted wirelessly through the glass substrate 110 to the apertures, and can be further fed to the feed lines 172 through the conductive paths provided by the interconnection layers 134A and 136A.

Since the distance between the antennas 120 and the ground plane 174 may affect the transmission of the RF signal, the thickness of the glass substrate 110 should be determined according to the design of the antenna 120 and the working frequency of the RF signals. In some embodiments, the thickness of the glass substrate 110 can be between 300 μm and 1000 μm.

In such case, since the glass substrate 110 can provide enough of thickness between the antennas 120 and the ground plane 174, the number of interconnection layers 134A, 134B, 136A and 136B can be smaller than the number of layers required by a HDI PCB based antenna package as shown in FIG. 1B. In some embodiments, the summation of the numbers of interconnection layers in the multi-circuit layer structure 130 may be equal to or fewer than 6, and a thickness of each of the interconnection layers, such as 134A or 136A, may be greater than 50 μm, and a dielectric portion of the interconnection layers 134A or 136A may be composed of pre-preg materials, FR-4, or FR-5. Furthermore, in some embodiments, the interconnection layers 134A, 134B, 136A and 136B may be formed symmetrically with respect to the core 132. That is, the number of the interconnection layers 134A, 134B may be equal to the number of the interconnection layers 136A and 136B.

Furthermore, the distance between the ground plane 174 and the feed lines 172 may significantly affect the impedance between the ground plane 174 and the feed lines 172, and thus, the thickness of the core 132 may be determined according to the desired matching impedance between the ground plane 174 and the feed lines 172 so as to reduce the signal loss. In some embodiments, a coreless multi-layer circuit structure 130 can be implemented in the antenna package 100 described herein.

Figure 3:
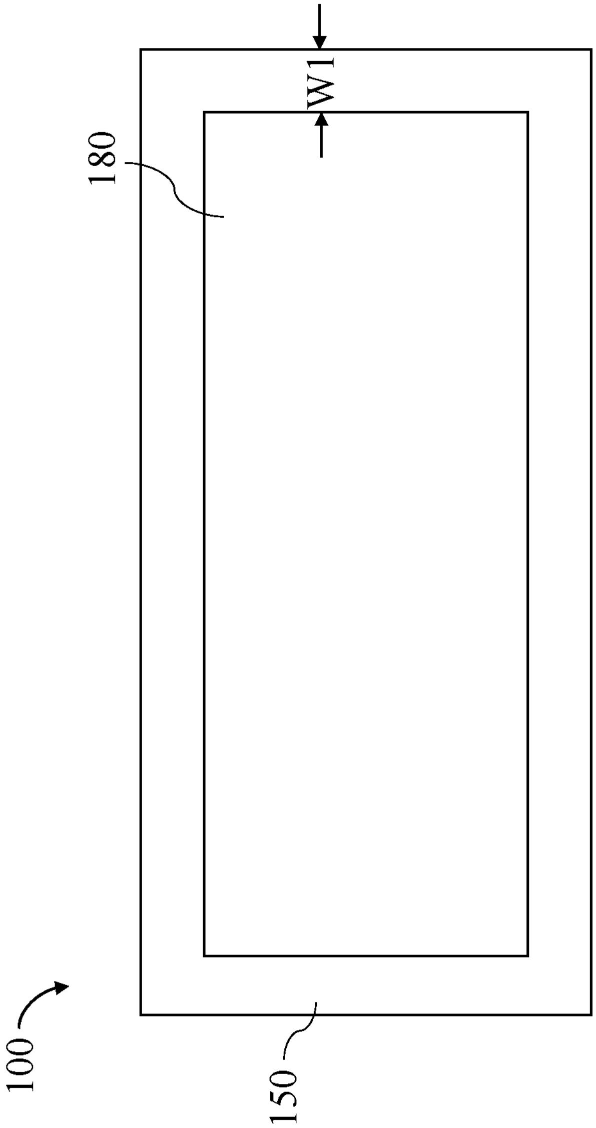
FIG. 3 shows a top view of the antenna package in FIG. 2 according to one embodiment of the present disclosure.

FIG. 3 shows a top view of the antenna package 100 according to one embodiment of the present disclosure. As shown in FIGS. 2 and 3, the adhesion material 150 is applied on the second surface 130B of the multi-layer circuit structure 130 and surrounding the glass substrate 110. In such case, the area of the glass substrate 110 is smaller than the area of the multi-layer circuit structure 130 so as to leave spaces for applying the adhesion material 150 on the multi-layer circuit structure 130 and allow the adhesion material 150 to surround the glass substrate 110, thereby fixing the glass substrate 110 to the multi-layer circuit structure 130. In some embodiments, the width W1 of the adhesion material 150 applied on the multi-layer circuit structure 130 may be greater than 2 mm, and the height H1 that the adhesion material 150 piled on the multi-layer circuit structure 130 may be greater than one third the height of the glass substrate 110. In some embodiments, the width W1 may be smaller than 2 mm and/or the height H1 may be smaller than one third the height of the glass substrate 110 if the adhesion material 150 is strong enough to fix the glass substrate 110 on the multi-layer circuit structure 130.

Figure 4:
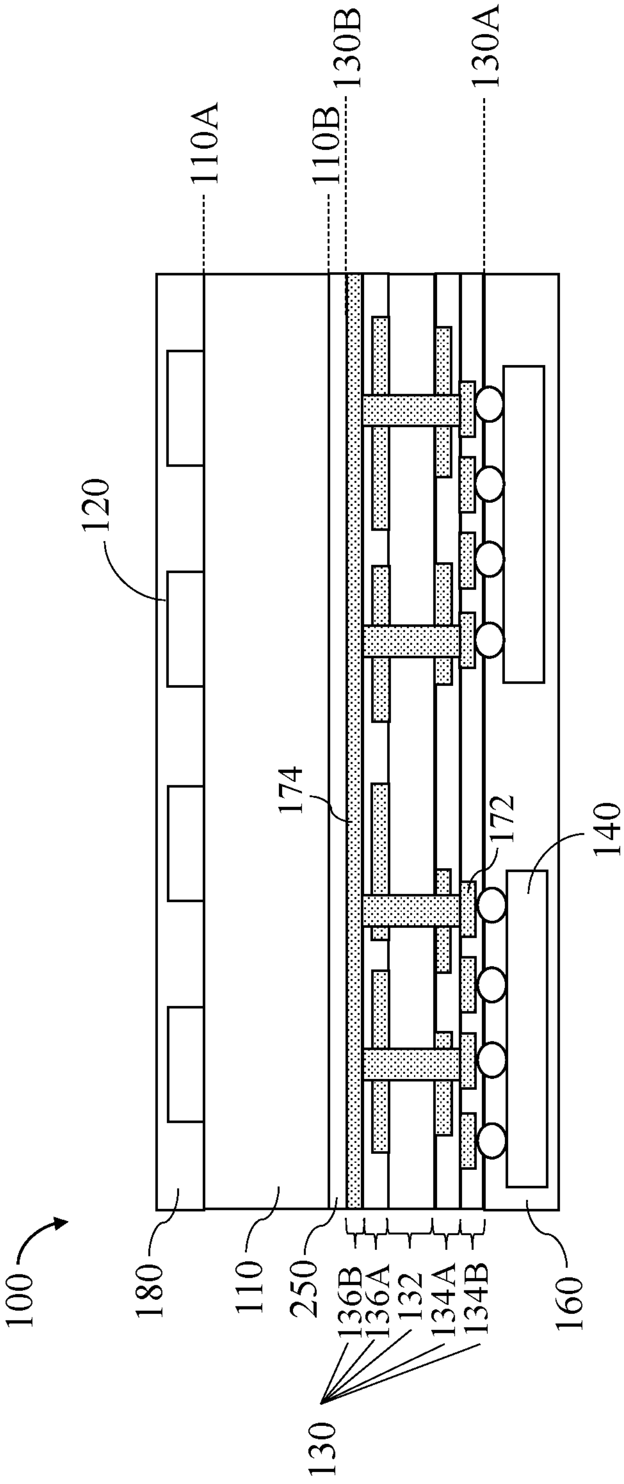
FIG. 4 shows an antenna package according to another embodiment of the present disclosure.

In the present embodiment, the adhesion material 150 may include UV adhesives and/or silicone. However, the present disclosure is not limited thereto. In some embodiments, other types of adhesion material may be adopted. Furthermore, instead of applying the adhesion material to surround the glass substrate 110, the adhesion material may be applied between the glass substrate 110 and the multi-layer circuit structure 130. FIG. 4 shows an antenna package 200 according to another embodiment of the present disclosure. The antenna package 200 and the antenna package 100 have similar structures, however, the adhesion material 250 adopted in the antenna package 200 is applied between the second surface 110B of the glass substrate 110 and the second surface 130B of the multi-layer circuit structure 130.

In such case, since the distance between the antennas 120 and the ground plane 174 may affect the transmission of the RF signal, the thickness of the adhesion material 250 that is disposed between the antennas 120 and the ground plane 174 may be determined with care. In some embodiments, the thickness of the adhesion material 250 is about 50 μm while the thickness of the glass substrate is between 300 μm and 1000 μm.

Figure 5:
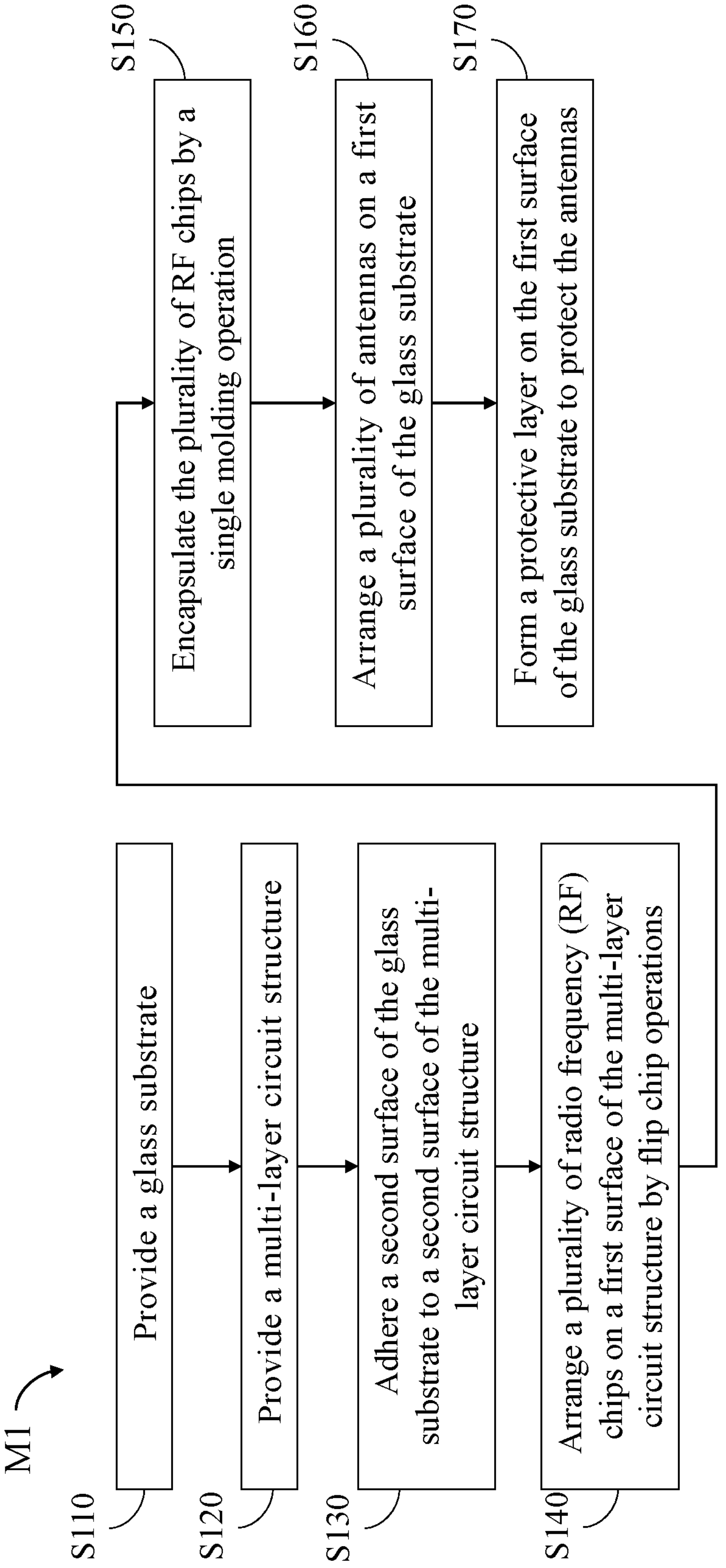
FIG. 5 shows a flow chart of a method for manufacturing an antenna package according to one embodiment of the present disclosure.

FIG. 5 shows a flow chart of a method M1 for manufacturing an antenna package according to one embodiment of the present disclosure. The method M1 includes steps S110 to S170. In some embodiments, the method M1 can be applied to manufacturing the antenna package 100, and FIGS. 6A to 6G are cross-sectional diagrams showing the manufacturing process of the antenna package 100 according to the method M1.

Figure 6A:
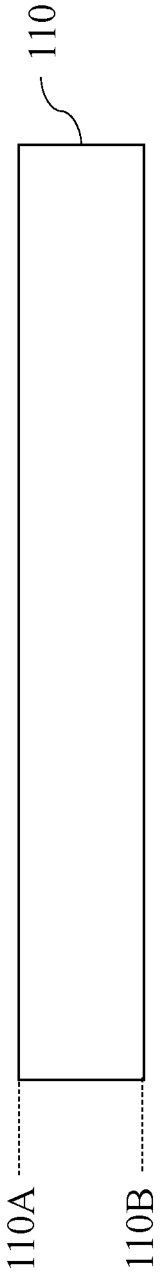
FIGS. 6A to 6G are cross-sectional diagrams showing the manufacturing process of the antenna package in FIG. 2 according to the method in FIG. 3.

In step S110, the glass substrate 110 is provided as shown in FIG. 6A. Generally, the glass substrate 110 has advantages such as good insulating property and low electrical loss (particularly at high working frequencies). Furthermore, the characteristic of low CTE makes the glass substrate 110 a good candidate to prevent warpage of the antenna package 100. In some embodiments, the glass substrate 110 has a rectangular shape or a square shape that has four straight sides. In some embodiments, the antenna package can be a large-scale antenna package that may accommodate more than 256 antennas 120, and the length of a side of the glass substrate 110 (i.e., the side length of the antenna package 100) is no less than about 200 mm. In some embodiments, the thickness of the glass substrate 110 can be from 0.3 mm to 1 mm depending on the design of a distance between the ground plane and the antenna patches based on key parameters of RF signal transmission.

Figure 6B:
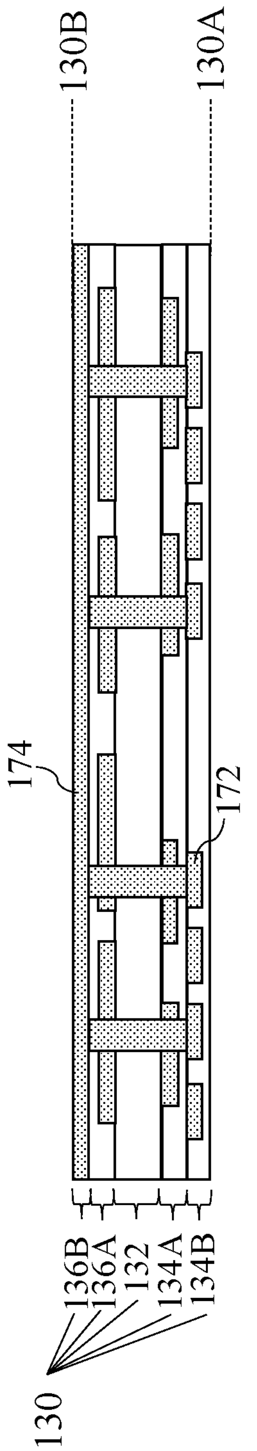

In step S120, a multi-layer circuit structure 130 is provided as shown in FIG. 6B. The multi-layer circuit structure 130 has a first surface 130A and a second surface 130B, and the first surface 130A can be used to accept the RF chips 140 in the subsequent operations. In some embodiments, the multi-layer circuit structure 130 can be a core or coreless PCB substrate with or without high density interconnect features, as long as the impedance between the ground plane 174 and the feed lines 172 (shown in FIG. 2) can be matched via the design of conductive line wiring. In some embodiments, the multi-layer circuit structure 130 may include 4 or 6 build-up layers with a total thickness of hundreds of micrometers. The dielectric of the build-up layers can include pre-preg materials, FR-4, or FR-5.

Figure 6C:
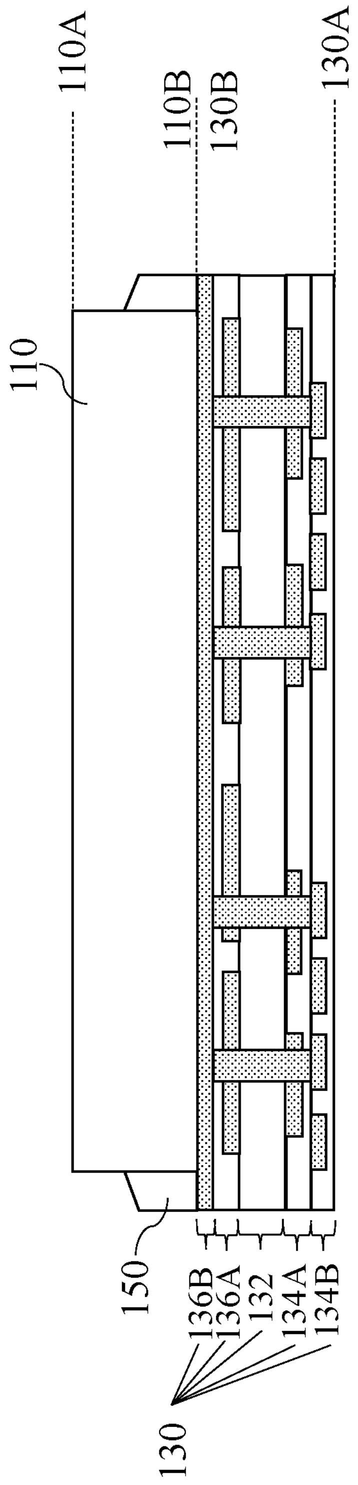

Prior to the RF chips 140 being attached to the first surface 130A of the multi-layer circuit structure 130, the second surface 130B of the multi-layer circuit structure 130 can be adhered to the second surface 110B of the glass substrate 110 in step S130 as shown in FIG. 6C. In the present embodiment, the second surface 130B of the multi-layer circuit structure 130 can be adhered to the second surface 110B of the glass substrate 110 by applying adhesion material 150 on the second surface 130B of the multi-layer circuit structure 130 and surrounding the glass substrate 110 as shown in FIG. 6C (also see FIG. 3). However, the present disclosure is not limited thereto.

In some embodiments, the second surface 130B of the multi-layer circuit structure 130 can be adhered to the second surface 110B of the glass substrate 110 by applying adhesion material 250 between the second surface 130B of the multi-layer circuit structure 130 and the second surface 110B of the glass substrate 110 as shown in FIG. 4. In such case, the adhesion material 250 may include a low CTE, low loss tangent material that simultaneously provide sufficient adherence between the multi-layer circuit structure 130 and the glass substrate 110 so that the glass substrate 110, which is also made of low-CTE material, can maintain the multi-layer circuit structure 130 planarity even when the antenna package 100 is designed for a large area scale (e.g., equal to or greater than 200 mm×200 mm) and is manufactured with high-temperature conditions (e.g., 200° C. to 250° C.).

In some embodiments, the thickness of the adhesion material 250 can be from 30 μm to 100 μm, which is considerably thinner than the thickness of the glass substrate 110 in order not to substantially interfere the designed distance for electromagnetic signal transmission. The adhesion material 250 may also select from materials which are capable of providing stress relief. In some embodiments, the glass substrate 110 can be adhere to the multi-layer circuit structure 130 by an adhesion material 250 composed of a dry film via a lamination operation. Furthermore, in some embodiments, both adhesion materials 150 and 250 may be applied to further strengthen the adhesion between the glass substrate 110 and the multi-layer circuit structure 130.

Figure 6D:
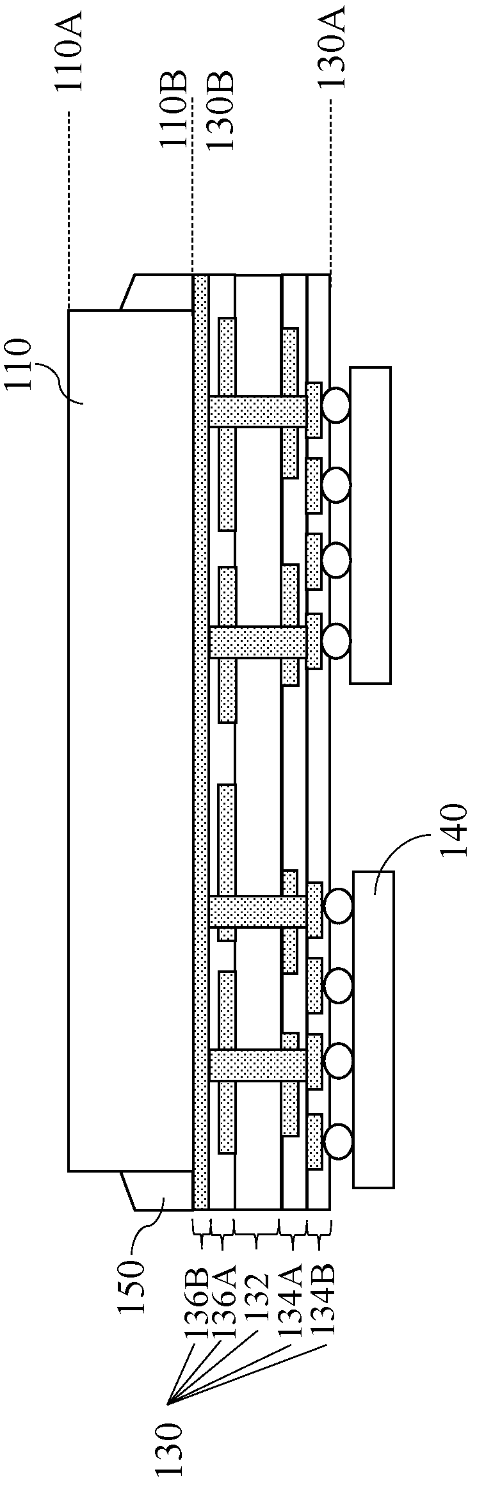

After adhering the glass substrate 110 to the multi-layer circuit structure 130, the RF chips 140 can be arranged on the first surface 130A of the multi-layer circuit structure 130 in step S140. In the present embodiments, the RF chips 140 can be bare dies, and in step S140, the RF chips 140 can be arranged on the multi-layer circuit structure 130 by flip chip operations as shown in FIG. 6D. In such case, the RF chips 140 may be attached to the first surface 130A of the multi-layer circuit structure 130 by soldering or other bonding technique that requires high temperature condition (e.g., 200° C. to 250° C.) without concerning the warpage of the multi-layer circuit structure 130.

In some embodiments, each of the RF chips 140 may be used to control multiple antennas 120. For example, a RF chips 140 may be coupled to four different antennas 120 for controlling. In such case, if the antennas 120 are arranged as a 16×16 antenna array in the antenna package 100, then the antenna package 100 may include 8×8 RF chips on the multi-layer circuit structure 130. However, the present disclosure is not limited thereto.

Figure 6E:
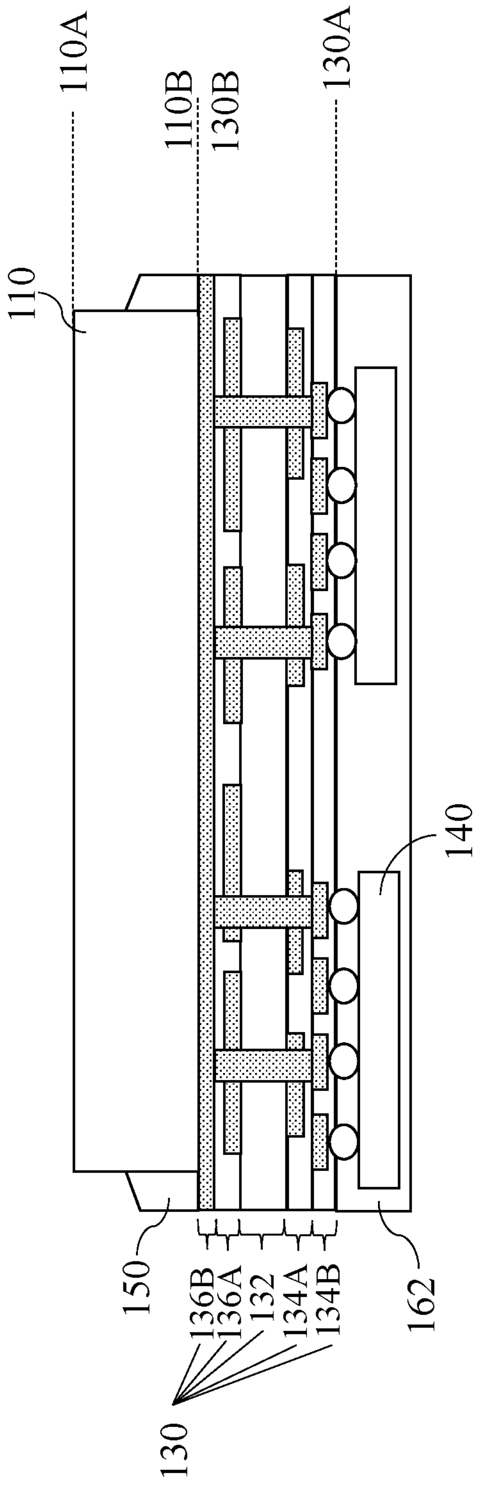

Furthermore, since the multi-layer circuit structure 130 can be adhered to or carried by the glass substrate 110, preventing the antenna package 100 from being warped under high temperature (e.g., 200° C. to 250° C.), the RF chips 140 can be encapsulated by one single molding operation in step S150. For example, as shown in FIG. 6E, a molding material 162 can be applied on the first surface 130A of the multi-layer circuit structure 130 and cover all the RF chips 140, in individual bare die form, arranged on the first surface 130A of the multi-layer circuit structure 130. Afterward, the molding material 162 can be cured by temperature elevation while the multi-layer circuit structure 130 can remain its planarity. As a result, in FIG. 2, the molding layer 160 that continuously encapsulate multiple RF chips 140 can be formed. Alternatively, there is no molding boundaries or air gaps between adjacent RF chips 140. In some embodiments, with the usage of the glass substrate 110, the warpage of the antenna package 100 can be controlled smaller than 0.75%. That is, if the length of the side of the glass substrate 110 is 200 mm, the height distortion of the antenna package 100 caused by warpage can be smaller than 1.5 mm (i.e., 200 mm×0.75%). However, the present disclosure is not limited thereto.

In some embodiments, the molding material 162 can be molding-underfill (MUF) material that can, in one operation, fill the gaps between the bonding or soldering structures under the RF chips 140 and the first surface 130A of the multi-layer circuit structure 130, and mold the RF chips 140 thereon. However, the present disclosure is not limited thereto. In some embodiments, the molding process may adopts two different materials for underfill and molding. For example, an underfill material, such as capillary underfill (CUF), may be applied to fill the gaps between the bonding or soldering structures under the RF chips 140 and the first surface 130A of the multi-layer circuit structure 130, and then, a molding material, such as molding epoxy, may be applied to on top of the RF chips 140 and the underfill material. Furthermore, in some embodiments, the molding operation can be performed by vacuum laminating with a dry film.

Figure 6F:
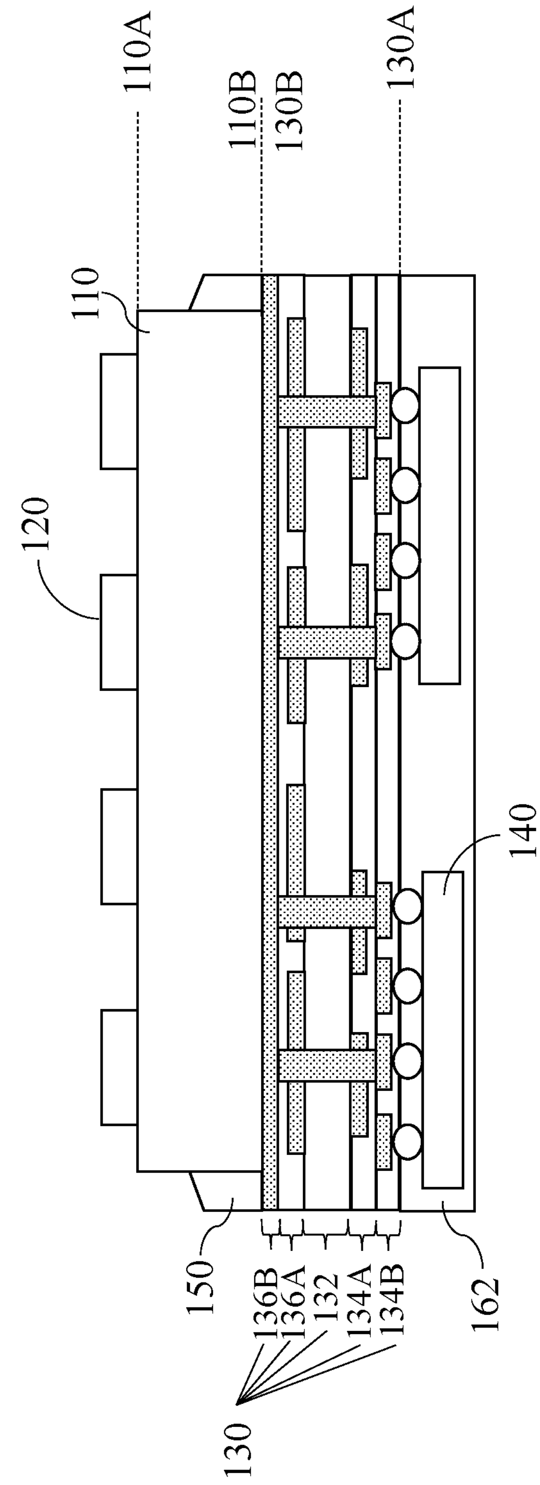

In step S160, a plurality of antennas 120 are arranged on the first surface 110A of the glass substrate 110 as shown in FIG. 6F. The antennas 120 can be arranged as a phased-array antenna whose single radiators can be fed with different phase shifts so as to achieve beamforming for long distance transmission, such as the satellite communication aforementioned.

Figure 6G:
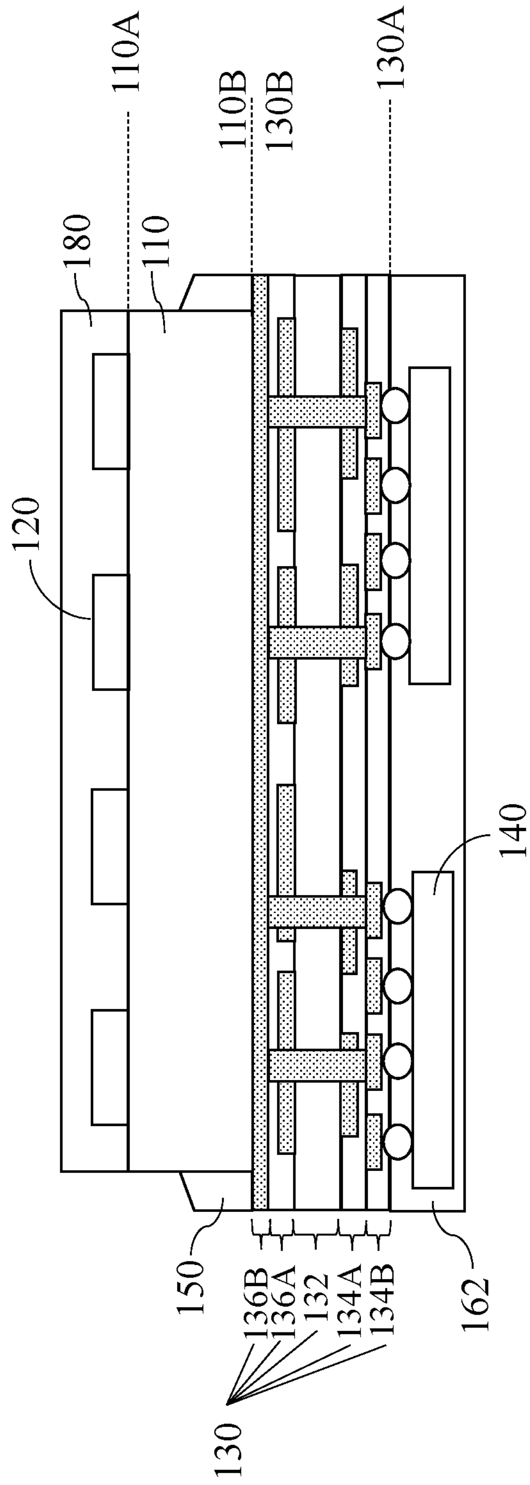

In some embodiments, the antennas 120 can be patch antennas that have flat profile, and thus, can be disposed or plated on the first surface 110A of the glass substrate 110. However, the present disclosure is not limited thereto. In some embodiments, the antennas 120 may be arranged on the first surface 110A of the glass substrate 110 by printing metal materials, such as gold paste, silver paste, copper paste, or mixtures thereof. After the antennas 120 are arranged on the first surface 110A of the glass substrate 110, a protective layer 180 can be formed on the first surface 110A of the glass substrate 110 to protect the antennas 120 in step S170 as shown in FIG. 6G.

In some embodiments, since the antennas 120 may have to be aligned with the apertures in the ground plane 174, it may be preferred to arrange the antennas 120 on the substrate glass 110 after the glass substrate 110 is adhered to the multi-layer circuit structure 130 so that the alignment can be performed with better precision. However, the present disclosure is not limited thereto.

It should be noted that, the order shown in the flow chart in FIG. 5 is not to limit the performing order of the method M1. In some embodiments, steps S110 to S170 in method M1 may be performed in other orders. For example, steps S110 and S120 may be performed in parallel by different factories. Furthermore, in some embodiments, if the warpage of the multi-layer circuit structure 130 is acceptable, then the RF chips 140 may be arranged on the multi-layer circuit structure 130 (step S140) even before the multi-layer circuit structure 130 is adhered to the glass substrate 110 (step S130). In such case, the molding process (step S150) may also be performed before step S130. However, in some embodiments, to reduce the warpage of the multi-layer circuit structure 130, the molding process for encapsulating the top of the RF chips 140 may be omitted while only the underfill process is performed to protect the soldering structures of the RF chips 140. In addition, steps S160 and S170 may be performed before step S130. That is, the antennas 120 may be arranged on the glass substrate 110 before adhering the glass substrate 110 to the multi-layer circuit structure 130. Alternatively, steps S160 and S170 may be performed after step S130 and before steps S140 and S150.

The antenna package and the method for manufacturing an antenna package provided by the embodiments of the present disclosure can laminate a circuit board to a glass substrate. In such case, the low-CTE glass substrate can provide sufficient rigidity to the circuit board, and thus, the antenna package can remain its planarity profile even when the package is at a large area scale (e.g., equal to or greater than 200 mm to 200 mm) and requires processes under high temperatures (e.g., 200° C. to 250° C.), thereby allowing the multiple RF chips to be molded in one single molding operation. As a result, the manufacturing process can be simplified and the production cost can be reduced.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein, may be utilized according to the present disclosure. Accordingly, the appended claims are intended to include within their scope such processes, machines, manufacture, compositions of matter, means, methods, and steps.

What is claimed is:

1. An antenna package, comprising:

a glass substrate having a first surface and a second surface; and a plurality of antennas arranged on the first surface of the glass substrate;

a multi-layer circuit structure having a first surface and a second surface; and a plurality of radio frequency (RF) chips arranged on the first surface of the multi-layer circuit structure;

wherein the second surface of the glass substrate is adhered to the second surface of the multi-layer circuit structure;

wherein the multi-layer circuit structure comprises:

a core;

a first number of first interconnection layers arranged between the core and the first surface of the multi-layer circuit structure; and a second number of second interconnection layers arranged between the core and the second surface of the multi-layer circuit structure;

wherein the first interconnection layers comprises a plurality of feed lines at the first surface of the multi-layer circuit structure coupled to the plurality of RF chips; and wherein the second interconnection layers comprises a ground plane at the second surface of the multi-layer circuit structure.

2. The antenna package of claim 1, wherein a thickness of each of the first interconnection layers is greater than 50 μm.

3. The antenna package of claim 1, wherein a summation of the first number and the second number is equal to or fewer than 6.

4. The antenna package of claim 1, wherein a thickness of the glass substrate is between 300 μm and 1000 μm.

5. The antenna package of claim 1, further comprising at least one of a first adhesion material applied on the second surface of the multi-layer circuit structure and surrounding the glass substrate, and a second adhesion material applied between the second surface of the glass substrate and the second surface and the multi-layer circuit structure.

6. The antenna package of claim 3, wherein the plurality of antennas are printed on the first surface of the glass substrate by adopting at least one of gold paste, silver paste, and copper paste.

7. The antenna package of claim 1, further comprising a molding layer covering the RF chips on the first surface of the multi-layer circuit structure, wherein the molding layer forms a continuous encapsulation to the RF chips.

8. The antenna package of claim 1, wherein a dielectric portion of the multi-layer circuit structure comprises prepreg materials, FR-4, or FR-5.

9. The antenna package of claim 1, wherein an area of the antenna package is greater than 200 mm×200 mm.

10. A method for manufacturing an antenna package, comprising:

providing a glass substrate having a first surface and a second surface;

providing a multi-layer circuit structure having a first surface and a second surface;

adhering the second surface of the glass substrate to the second surface of the multi-layer circuit structure; and arranging a plurality of antennas on the first surface of the glass substrate;

wherein the multi-layer circuit structure comprises:

a core;

a first number of first interconnection layers arranged between the core and the first surface of the multi-layer circuit structure; and a second number of second interconnection layers arranged between the core and the second surface of the multi-layer circuit structure;

wherein the first interconnection layers comprises a plurality of feed lines at the first surface of the multi-layer circuit structure coupled to the plurality of RF chips; and wherein the second interconnection layers comprises a ground plane at the second surface of the multi-layer circuit structure.

11. The method of claim 10, further comprising:

arranging a plurality of radio frequency (RF) chips on the first surface of the multi-layer circuit structure by flip chip operations after adhering the glass substrate to the multi-layer circuit structure.

12. The method of claim 11, further comprising:

encapsulating the plurality of RF chips by a single molding operation after adhering the glass substrate to the multi-layer circuit structure.

13. The method of claim 12, wherein the single molding operation comprises:

applying a molding material on the first surface of the multi-layer circuit structure; and curing the molding material.

14. The method of claim 10, wherein adhering the glass substrate to the multi-layer circuit structure comprises at least one of:

applying a first adhesion material on the second surface of the multi-layer circuit structure and surrounding the glass substrate; and applying a second adhesion material between the second surface of the glass substrate on the second surface of the multi-layer circuit structure.

15. The method of claim 10, wherein adhering the glass substrate to the multi-layer circuit structure comprises performing a dry film lamination operation.

16. The method of claim 10, further comprising:

forming a protective layer on the first surface of the glass substrate to protect the plurality of antennas prior to the adhering operation.

* * * * *